United States Patent
Kobayashi

(10) Patent No.: US 12,334,583 B2
(45) Date of Patent: Jun. 17, 2025

(54) BATTERY WITH IMPROVED GAS TO MOISTURE PERMEABILITY RATIO

(71) Applicant: W. L. Gore & Associates G.K., Tokyo (JP)

(72) Inventor: Kotaro Kobayashi, Tokyo (JP)

(73) Assignee: W. L. Gore & Associates G.K., Tokyo (JP)

( * ) Notice: Subject to any disclaimer, the term of this patent is extended or adjusted under 35 U.S.C. 154(b) by 573 days.

(21) Appl. No.: 17/767,560

(22) PCT Filed: Oct. 21, 2019

(86) PCT No.: PCT/IB2019/001124
§ 371 (c)(1),
(2) Date: Apr. 8, 2022

(87) PCT Pub. No.: WO2021/079163
PCT Pub. Date: Apr. 29, 2021

(65) Prior Publication Data
US 2022/0399611 A1    Dec. 15, 2022

(51) Int. Cl.
*H01M 50/30*      (2021.01)
*B01D 69/02*      (2006.01)
(Continued)

(52) U.S. Cl.
CPC ..... *H01M 50/394* (2021.01); *H01M 10/0525* (2013.01); *H01M 50/317* (2021.01);
(Continued)

(58) Field of Classification Search
CPC ............ H01M 50/394; H01M 50/417; H01M 50/426; H01M 50/30; H01M 50/471; H01M 50/48; H01M 50/486
See application file for complete search history.

(56) References Cited

U.S. PATENT DOCUMENTS 3,953,566 A    4/1976  Gore
4,385,093 A    5/1983  Hubis
               (Continued)

FOREIGN PATENT DOCUMENTS

CN    106058120 A    10/2016
EP      2410592 A1    1/2012
               (Continued)

OTHER PUBLICATIONS

Omnexus. SpecialChem. 2024. p. 1 (Year: 2024).*
(Continued)

*Primary Examiner* — Christopher P Domone
(74) *Attorney, Agent, or Firm* — Faegre Drinker Biddle & Reath LLP

(57) ABSTRACT

Some embodiments of the present disclosure relate to a battery comprising a housing. In some embodiments, the housing comprises an opening. In some embodiments, the battery comprises at least one fluoropolymer membrane. In some embodiments, the at least one fluoropolymer membrane covers the opening of the housing. In some embodiments, the at least one fluoropolymer membrane has a crystallinity of 85% to 100%. In some embodiments, the at least one fluoropolymer membrane has a density of 2.0 $g/cm^3$ to 2.2 $g/cm^3$. In some embodiments, the at least one fluoropolymer membrane has a $CO_2$ permeability to moisture permeability ratio of more than 0.5. A polytetrafluoroethylene film for electronic components, characterized in that the polytetrafluoroethylene film can have a density of 1.40 $g/cm^3$ or higher and an air impermeability of 3,000 seconds or higher.

14 Claims, 4 Drawing Sheets

(51) Int. Cl.
*B01D 69/12* (2006.01)
*B01D 71/32* (2006.01)
*B01D 71/36* (2006.01)
*H01M 10/0525* (2010.01)
*H01M 50/317* (2021.01)
*H01M 4/02* (2006.01)
*H01M 4/38* (2006.01)
*H01M 4/485* (2010.01)
*H01M 4/505* (2010.01)
*H01M 4/525* (2010.01)
*H01M 4/58* (2010.01)
*H01M 4/587* (2010.01)
*H01M 10/0567* (2010.01)
*H01M 10/0569* (2010.01)
*H01M 50/417* (2021.01)
*H01M 50/426* (2021.01)

(52) U.S. Cl.
CPC ............ *H01M 2004/027* (2013.01); *H01M 2004/028* (2013.01); *H01M 4/382* (2013.01); *H01M 4/387* (2013.01); *H01M 4/485* (2013.01); *H01M 4/505* (2013.01); *H01M 4/525* (2013.01); *H01M 4/5825* (2013.01); *H01M 4/587* (2013.01); *H01M 10/0567* (2013.01); *H01M 10/0569* (2013.01); *H01M 50/417* (2021.01); *H01M 50/426* (2021.01); *H01M 2300/0028* (2013.01)

(56) References Cited

U.S. PATENT DOCUMENTS

| | | | |
|---|---|---|---|
| 4,728,876 A | 3/1988 | Mongeon et al. | |
| 5,506,067 A | 4/1996 | Tinker | |
| 5,591,540 A | 1/1997 | Louie et al. | |
| 6,120,931 A | 9/2000 | Fossati et al. | |
| 6,368,741 B1 | 4/2002 | Hackel et al. | |
| 2003/0175582 A1 | 9/2003 | Phillips | |
| 2006/0024574 A1 | 2/2006 | Yim et al. | |
| 2011/0318615 A1 | 12/2011 | Chun et al. | |
| 2012/0015218 A1* | 1/2012 | Lee | H01M 50/30 429/53 |
| 2012/0315510 A1 | 12/2012 | Tenhouten et al. | |
| 2013/0032219 A1 | 2/2013 | Heim et al. | |
| 2013/0095393 A1 | 4/2013 | Friesen et al. | |
| 2013/0136959 A1 | 5/2013 | Baek et al. | |
| 2014/0079964 A1 | 3/2014 | Gless et al. | |
| 2014/0087230 A1 | 3/2014 | Schaefer | |
| 2016/0036025 A1 | 2/2016 | Hofer | |
| 2017/0002156 A1 | 1/2017 | Chaen et al. | |
| 2019/0140326 A1 | 5/2019 | Kobayashi | |
| 2020/0161698 A1* | 5/2020 | Higuchi | H01M 10/0525 |
| 2020/0227715 A1* | 7/2020 | Koo | H01M 50/169 |

FOREIGN PATENT DOCUMENTS

| | | | |
|---|---|---|---|
| JP | 57-131236 A | 8/1982 | |
| JP | 61-161656 A | 6/1986 | |
| JP | 2002-192614 A | 7/2002 | |
| JP | 2004-036749 A | 2/2004 | |
| JP | 2004-281061 A | 10/2004 | |
| JP | 2006-012814 A | 1/2006 | |
| JP | 2012-190639 A | 10/2012 | |
| JP | 2015-060803 A | 3/2015 | |
| JP | 2016-145361 A | 8/2016 | |
| JP | 2016-152068 A | 8/2016 | |
| JP | 2019-179638 A | 10/2019 | |
| WO | 96/08048 A1 | 3/1996 | |
| WO | 2018/016358 A1 | 1/2018 | |
| WO | 2018/117055 A1 | 6/2018 | |
| WO | 2019/132044 A1 | 7/2019 | |

OTHER PUBLICATIONS

Omnexus. SpecialChem. 2024. p. 2 (Year: 2024).*
Daikin Industries Ltd., "Fluoropolymer: Neoflon PFA AF 0250," Oct. 2018, 1 page.
Donaldson, "Protecting Battery Enclosures with Dual-Stage Venting," Retrieved from https://www.donaldson.com/en-us/venting/technical-articles/protecting-battery-enclosures-dual-stage-venting/, 1 page, publicly available at least by Oct. 20, 2018.
International Preliminary Report on Patentability received for PCT Patent Application No. PCT/IB2019/001124, mailed on May 5, 2022, 8 pages.
International Search Report and Written Opinion received for PCT Patent Application No. PCT/IB2019/001124, mailed on Jul. 8, 2020, 10 pages.
Nitto Denko Corporation, "Fluoroplastic Film: NITOFLON No. 900UL," 5 pages, publicly available at least by Oct. 20, 2018.
Teng et al., "In-situ analysis of gas generation in lithium ion batteries with different carbonate-based electrolytes", Applied Materials & Interfaces, Sep. 29, 2015, pp. 1-7.

* cited by examiner

Structure of test equipment for gas permeability

BATTERY WITH IMPROVED GAS TO MOISTURE PERMEABILITY RATIO

CROSS-REFERENCE TO RELATED APPLICATION

This application is a national phase application of PCT Application No. PCT/IB2019/001124, internationally filed on Oct. 21, 2019, which is herein incorporated by reference in its entirety, including Appendix A thereto, for all purposes.

FIELD

The present disclosure relates to a battery having an improved gas permeability to moisture permeability ratio.

BACKGROUND

Batteries, such as lithium-ion batteries, are used to power a wide array of electronic devices including automobiles and mobile phones. While enormous gains have been made in the performance of batteries over the last few decades, improvements to several aspects of battery performance (e.g., battery life, battery output, and the like) are still needed.

SUMMARY

Covered embodiments are defined by the claims, not this summary. This summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Some embodiments of the present disclosure relate to a battery comprising a housing. In some embodiments, the housing comprises an opening.

In some embodiments, the battery further comprises at least one fluoropolymer membrane. In some embodiments, the at least one fluoropolymer membrane covers the opening of the housing. In some embodiments, the at least one fluoropolymer membrane comprises at least one of polytetrafluoroethylene (PTFE), densified PTFE (dPTFE), expanded PTFE (ePTFE), perfluoroalkoxyalkane (PFA), fluorinated ethylene-propylene (FEP), polyethylenetetrafluoroethylene (ETFE), polyethylenechlorotrifluoroethylene (ECTFE), polychlorotrifluoroethylene (PCTFE), or any combination thereof. In some embodiments, the at least one fluoropolymer membrane has a crystallinity of 85% to 100%. In some embodiments, the at least one fluoropolymer membrane has a density of 2.0 $g/cm^3$ to 2.2 $g/cm^3$. In some embodiments, the at least one fluoropolymer membrane has a Carbon Dioxide ($CO_2$) permeability to moisture permeability ratio of more than 0.5. In some embodiments, the at least one fluoropolymer membrane has a $CO_2$ permeability to moisture permeability ratio of more than 0.5 and less than 1.5.

In some embodiments, the battery further comprises a positive electrode. In some embodiments, the positive electrode is at least partially disposed within the housing. In some embodiments, the positive electrode is chosen from: Lithium Nickel Manganese Cobalt Oxide ("NMC"), Lithium Nickel Cobalt Aluminum Oxide ("NCA"), Lithium Manganese Oxide ("LMO"), Lithium Iron Phosphate ("LFP"), Lithium Cobalt Oxide ("LCO"), or any combination thereof.

In some embodiments, the battery further comprises a negative electrode. In some embodiments, the negative electrode is at least partially disposed within the housing. In some embodiments, the negative electrode is chosen from: Lithium, Graphite, Lithium Titanate ("LTO"), a Tin-Cobalt alloy, or any combination thereof.

In some embodiments, the battery further comprises an electrolyte. In some embodiments, the electrolyte is disposed between the positive electrode and the negative electrode. In some embodiments, the electrolyte is configured to release at least one gas during operation of the battery. In some embodiments, the at least one gas is chosen from $CO_2$, $H_2$, CO, or any combination thereof; and at least one fluoropolymer membrane. In some embodiments, the electrolyte is in the form of an electrolytic solution. In some embodiments, the electrolytic solution comprises at least one solvent and at least one electrolytic salt. In some embodiments, the at least one solvent of the electrolytic solution comprises at least one organic solvent. In some embodiments, the at least one organic solvent of the electrolyte is chosen from propylene carbonate, ethylene carbonate, Diethyl Carbonate (DEC), Dimethyl Carbonate (DMC), or mixtures thereof. In some embodiments, the electrolyte comprises at least one additive. In some embodiments, the at least one additive is configured to release the at least one gas chosen from $CO_2$, $H_2$, CO, or any combination thereof during operation of the battery. In some embodiments, the electrolyte is impregnated within at least one separator. In some embodiments, the at least one separator comprises at least one material chosen from polypropylene, polyethylene, at least one tetrafluoroethylene (TFE) polymer or copolymer, at least one homopolymer of vinylidene fluoride, at least one hexafluoropropylene (HFP)-vinylidene fluoride copolymer, or any combination thereof.

In some embodiments, the battery is a secondary battery. In some embodiments, the secondary battery is a lithium-ion battery.

DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Figure 1:
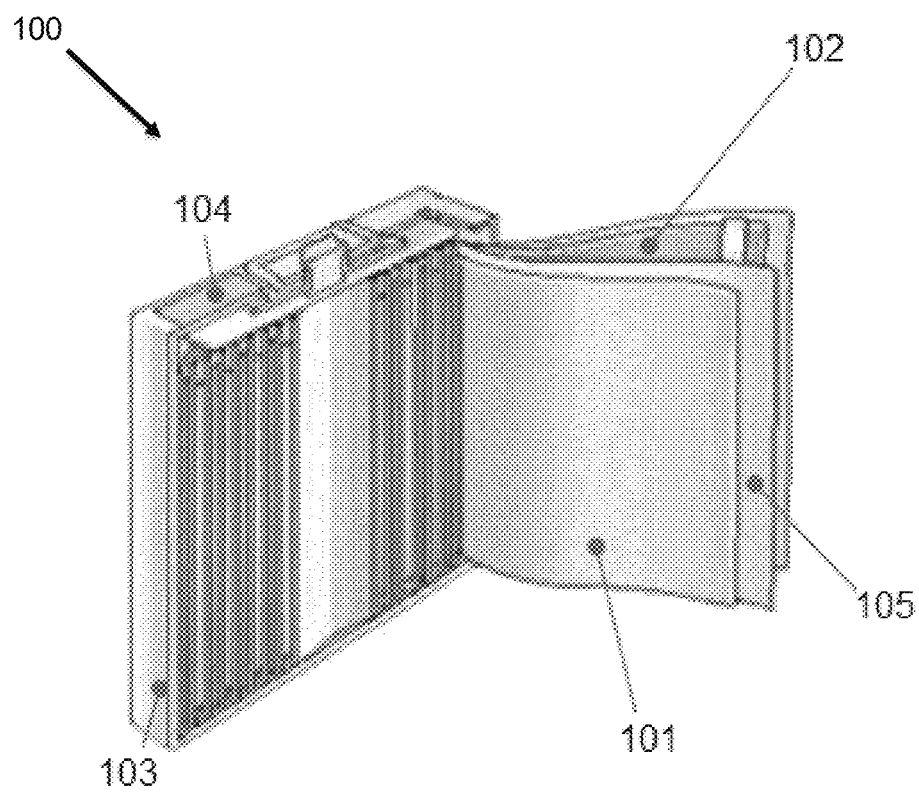
FIGS. 1-3 depict exemplary non-limiting embodiments of batteries according to the present disclosure.

Among those benefits and improvements that have been disclosed, other objects and advantages of this disclosure will become apparent from the following description taken in conjunction with the accompanying figures. Detailed embodiments of the present disclosure are disclosed herein;

however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

All prior patents, publications, and test methods referenced herein are incorporated by reference in their entireties.

As used herein, the term "housing" is defined as a casing that encloses components of a battery.

As used herein, an "electrolyte" is defined as any medium that is configured to carry charged particles between a negative electrode and a positive electrode. Electrolytes can take a variety of forms including but not limited to: solutions, acids, bases, gels, polyelectrolytes, ceramics, the like, or any combination thereof.

As used herein, "crystallinity" is defined as the degree of structural order of a solid. Crystallinity is measured in units of percent. A solid with a crystallinity of 0% is completely amorphous, whereas a solid with a crystallinity of 100% is completely crystalline. Crystallinities of the membranes described herein are measured using X-Ray Diffraction ("XRD"). The crystallinities of certain membranes described herein according to some non-limiting embodiments can also be calculated based on the procedure set forth in Satokawa et al., Plastic course—Fluoropolymer, the Nikkan Kogyo Shimbun Edition 3, page 18, (1978), which is incorporated by reference herein in its entirety.

As used herein, "moisture" is defined as a mixture comprising water and air.

As used herein, Carbon Dioxide ($CO_2$) permeability is measured using the "differential pressure" method set forth in JIS K7126-1 and by using the procedure and test setup described herein in the Examples section. $CO_2$ permeability has units of $cm^3 \cdot cm/(cm^2 \cdot s \cdot cmHg)$.

As used herein, moisture permeability is measured using the "Lyssy" method set forth herein in the Examples section. Moisture permeability has units of $cm^3 \cdot cm/(cm^2 \cdot s \cdot cmHg)$.

As used herein, the "$CO_2$ permeability to moisture permeability ratio" is calculated by dividing $CO_2$ permeability by moisture permeability. $CO_2$ permeability to moisture permeability ratio has no units (i.e., is dimensionless).

As used herein, a "secondary battery" is a rechargeable battery.

As used herein, "impregnated" means that at least a portion of a first substance fills at least a portion of a second substance. In one non-limiting example, a liquid can be said to impregnate the pores of a porous solid. A first substance can either "partially impregnate" or "fully impregnate" a second substance. A first substance "partially impregnates" a "second substance" when the first substance does not completely fill the second substance (i.e., more of the first substance can be impregnated into the second substance). A first substance "fully impregnates" a "second substance" when the first substance completely fills the second substance, such that no more of the first substance can be impregnated into the second substance.

As used herein, "operation of a battery" includes at least one of: charging a battery, discharging a battery, or any combination thereof.

As used herein, the term "lithium-ion battery" is any battery where lithium-ions are configured to move between a negative electrode and a positive electrode during operation of the battery. Examples of lithium-ion batteries include but are not limited to: lithium-ion polymer (LiPo) batteries, lithium sulfur (Li—S) batteries, and thin-film lithium batteries.

Some embodiments of the present disclosure relate to a battery comprising at least one housing. In some embodiments, the at least one housing has at least one shape. In some non-limiting embodiments, the at least one housing has a cylindrical shape. In some non-limiting embodiments, the at least one housing has a rectangular shape.

In some non-limiting embodiments, the at least one housing comprises at least one of: a metal, a metal alloy, or a combination thereof. In some non-limiting embodiments, the at least one housing comprises at least one of: Iron (Fe), Aluminum (Al), or alloys thereof. In some non-limiting embodiments, the at least one housing comprises at least one plastic.

In some embodiments, the at least one housing comprises at least one opening. In some embodiments, the at least one opening has at least one cross-sectional shape. In some embodiments, the at least one opening has a circular-shaped cross-section. In some embodiments, the at least one opening has a rectangular-shaped cross-section.

In some embodiments, the battery comprises a plurality of housings. In some embodiments, the plurality of housings comprises at least one first housing disposed within at least one second housing.

In some embodiments, the battery further comprises at least one membrane.

In some embodiments, the at least one membrane covers at least one opening of the at least one housing. In some embodiments, the at least one membrane covers a plurality of openings of the at least one housing. In some embodiments, the at least one membrane covers at least one opening of a plurality of housings. In some embodiments, the at least one membrane covers a plurality of openings of a plurality of housings.

In some embodiments, the at least one membrane has a crystallinity of 85% to 100%. In some embodiments, the at least one membrane has a crystallinity of 90% to 100%. In some embodiments, the at least one membrane has a crystallinity of 95% to 100%. In some embodiments, the at least one membrane has a crystallinity of 99% to 100%.

In some embodiments, the at least one membrane has a crystallinity of 85% to 99%. In some embodiments, the at least one membrane has a crystallinity of 85% to 95%. In some embodiments, the at least one membrane has a crystallinity of 85% to 90%.

In some embodiments, the at least one membrane has a crystallinity of 90% to 99%. In some embodiments, the at least one membrane has a crystallinity of 90% to 95%. In some embodiments, the at least one membrane has a crystallinity of 95% to 99%.

In some embodiments, the at least one membrane has a density of 2.0 g/cm³ to 2.2 g/cm³. In some embodiments, the at least one membrane has a density of 2.05 g/cm³ to 2.2 g/cm³. In some embodiments, the at least one membrane has a density of 2.1 g/cm³ to 2.2 g/cm³. In some embodiments, the at least one membrane has a density of 2.15 g/cm³ to 2.2 g/cm.

In some embodiments, the at least one membrane has a density of 2.0 g/cm³ to 2.15 g/cm³. In some embodiments, the at least one membrane has a density of 2.0 g/cm³ to 2.1 g/cm³. In some embodiments, the at least one membrane has a density of 2.0 g/cm³ to 2.05 g/cm³.

In some embodiments, the at least one membrane has a density of 2.05 g/cm³ to 2.15 g/cm³. In some embodiments, the at least one membrane has a density of 2.05 g/cm³ to 2.1 g/cm³. In some embodiments, the at least one membrane has a density of 2.1 g/cm³ to 2.15 g/cm³.

In some embodiments, the at least one membrane has a $CO_2$ permeability to moisture permeability ratio of more than 0.5. In some embodiments, the at least one membrane has a $CO_2$ permeability to moisture permeability ratio of more than 0.55. In some embodiments, the at least one membrane has a $CO_2$ permeability to moisture permeability ratio of more than 0.75. In some embodiments, the at least one membrane has a $CO_2$ permeability to moisture permeability ratio of more than 1.0. In some embodiments, the at least one membrane has a $CO_2$ permeability to moisture permeability ratio of more than 1.25. In some embodiments, the at least one membrane has a $CO_2$ permeability to moisture permeability ratio of more than 1.5.

In some embodiments, the at least one membrane has a $CO_2$ permeability to moisture permeability ratio of more than 0.5 and less than 1.5. In some embodiments, the at least one membrane has a $CO_2$ permeability to moisture permeability ratio of more than 0.55 and less than 1.5. In some embodiments, the at least one membrane has a $CO_2$ permeability to moisture permeability ratio of more than 0.75 and less than 1.5. In some embodiments, the at least one membrane has a $CO_2$ permeability to moisture permeability ratio of more than 1.0 and less than 1.5. In some embodiments, the at least one membrane has a $CO_2$ permeability to moisture permeability ratio of more than 1.25 and less than 1.5.

In some embodiments, the at least one membrane has a $CO_2$ permeability to moisture permeability ratio of more than 0.5 and less than 1.25. In some embodiments, the at least one membrane has a $CO_2$ permeability to moisture permeability ratio of more than 0.5 and less than 1. In some embodiments, the at least one membrane has a $CO_2$ permeability to moisture permeability ratio of more than 0.5 and less than 0.75. In some embodiments, the at least one membrane has a $CO_2$ permeability to moisture permeability ratio of more than 0.5 and less than 0.55.

In some embodiments, the at least one membrane has a $CO_2$ permeability to moisture permeability ratio of more than 0.55 and less than 1.5. In some embodiments, the at least one membrane has a $CO_2$ permeability to moisture permeability ratio of more than 0.55 and less than 1.25. In some embodiments, the at least one membrane has a $CO_2$ permeability to moisture permeability ratio of more than 0.55 and less than 1. In some embodiments, the at least one membrane has a $CO_2$ permeability to moisture permeability ratio of more than 0.55 and less than 0.75. In some embodiments, the at least one membrane has a $CO_2$ permeability to moisture permeability ratio of more than 0.75 and less than 1.25. In some embodiments, the at least one membrane has a $CO_2$ permeability to moisture permeability ratio of more than 0.75 and less than 1.

In some embodiments, the at least one membrane comprises at least one fluoropolymer membrane. In some embodiments, the at least one fluoropolymer membrane has at least one of: at least one density described herein, at least one crystallinity described herein, at least one $CO_2$ permeability to moisture permeability ratio described herein, or any combination thereof.

In some embodiments, the at least one fluoropolymer membrane comprises at least one of polytetrafluoroethylene (PTFE), densified PTFE (dPTFE), expanded PTFE (ePTFE), perfluoroalkoxyalkane (PFA), fluorinated ethylene-propylene (FEP), polyethylenetetrafluoroethylene (ETFE), polyethylenechlorotrifluoroethylene (ECTFE), polychlorotrifluoroethylene (PCTFE), or any combination thereof. In some embodiments, the at least one fluoropolymer membrane is selected from the group consisting of: polytetrafluoroethylene (PTFE), densified PTFE (dPTFE), expanded PTFE (ePTFE), perfluoroalkoxyalkane (PFA), fluorinated ethylene-propylene (FEP), polyethylenetetrafluoroethylene (ETFE), polyethylenechlorotrifluoroethylene (ECTFE), polychlorotrifluoroethylene (PCTFE), and combinations thereof.

In some embodiments, the at least one fluoropolymer membrane comprises at least one of PTFE, dPTFE, ePTFE, or any combination thereof. In some embodiments, the at least one fluoropolymer membrane is selected from the group consisting of PTFE, dPTFE, ePTFE, or any combination thereof.

In some embodiments, the at least one fluoropolymer membrane comprises ePTFE. In some embodiments, the at least one fluoropolymer membrane consists of ePTFE.

In some embodiments, the battery comprises a plurality of membranes. In some embodiments, at least one membrane of the plurality of membranes is a fluoropolymer membrane that includes at least one fluoropolymer described herein. In some embodiments, at least one membrane of the plurality of membranes is a fluoropolymer membrane that has at least one density described herein, at least one crystallinity described herein, at least one $CO_2$ permeability to moisture permeability ratio described herein, or any combination thereof.

In some embodiments the battery comprises a composite membrane. In some embodiments the composite membrane comprises a first membrane and a second membrane. In some embodiments, the composite membrane is formed by attaching the first membrane to the second membrane. Methods of attaching the first membrane to the second membrane include, but are not limited to, lamination, heat bonding, laser welding, or any combination thereof.

In some embodiments the first membrane of the composite membrane forms a first surface of the composite membrane. In some embodiments the second membrane of the composite membrane forms a second surface of the composite membrane. In some embodiments, the composite membrane covers at least one opening of the at least one housing with the first surface corresponding to the first membrane facing an inside of the at least one housing and the second surface corresponding to the second membrane facing an outside of the at least one housing.

In some embodiments, at least one of the first membrane of the composite membrane, the second membrane of the composite membrane, or any combination thereof is a fluoropolymer membrane that includes at least one fluoropolymer described herein. Additional non-limiting examples of composite membranes are described in Patent Cooperation Treaty (PCT) Application No. PCT/IB2019/000489 filed on Apr. 18, 2019, which is incorporated by reference herein in its entirety.

In some embodiments, the composite membrane has any density described herein (i.e., any density corresponding to any embodiment that includes a single membrane).

In some embodiments, the first membrane of the composite membrane has a first density. In some embodiments, the second membrane of the composite membrane has a second density. In some embodiments, the first density and the second density are the same. In some embodiments, the first density and the second density are different. In some embodiments, the second density is less than the first density. In some embodiments, the second density is more than the first density.

In some embodiments, the first density corresponding to the first membrane of the composite membrane ranges from 2.0 g/cm$^3$ to 2.2 g/cm$^3$. In some embodiments, the first density corresponding to the first membrane of the composite membrane ranges from 2.05 g/cm$^3$ to 2.2 g/cm$^3$. In some embodiments, the first density corresponding to the first membrane of the composite membrane ranges from 2.1 g/cm$^3$ to 2.2 g/cm$^3$. In some embodiments, the first density corresponding to the first membrane of the composite membrane ranges from 2.15 g/cm$^3$ to 2.2 g/cm.

In some embodiments, the first density corresponding to the first membrane of the composite membrane ranges from 2.0 g/cm$^3$ to 2.15 g/cm$^3$. In some embodiments, the first density corresponding to the first membrane of the composite membrane ranges from 2.0 g/cm$^3$ to 2.1 g/cm$^3$. In some embodiments, the first density corresponding to the first membrane of the composite membrane ranges from 2.0 g/cm$^3$ to 2.05 g/cm$^3$.

In some embodiments, the first density corresponding to the first membrane of the composite membrane ranges from 2.05 g/cm$^3$ to 2.15 g/cm$^3$. In some embodiments, the first density corresponding to the first membrane of the composite membrane ranges from 2.05 g/cm$^3$ to 2.1 g/cm$^3$. In some embodiments, the first density corresponding to the first membrane of the composite membrane ranges from 2.1 g/cm$^3$ to 2.15 g/cm$^3$.

In some embodiments, the second density corresponding to the second membrane of the composite membrane ranges from 0.7 g/cm$^3$ to 2.0 g/cm$^3$. In some embodiments, the second density corresponding to the second membrane of the composite membrane ranges from 1.0 g/cm$^3$ to 2.0 g/cm$^3$. In some embodiments, the second density corresponding to the second membrane of the composite membrane ranges from 1.7 g/cm$^3$ to 2.0 g/cm$^3$.

In some embodiments, the second density corresponding to the second membrane of the composite membrane ranges from 0.7 g/cm$^3$ to 1.7 g/cm$^3$. In some embodiments, the second density corresponding to the second membrane of the composite membrane ranges from 0.7 g/cm$^3$ to 1.0 g/cm$^3$.

In some embodiments, the second density corresponding to the second membrane of the composite membrane ranges from 1.0 g/cm$^3$ to 1.7 g/cm$^3$.

In some embodiments, at least one of: the first membrane of the composite membrane, the second membrane of the composite membrane, or any combination thereof is a fluoropolymer membrane that includes at least one fluoropolymer described herein. In some embodiments, at least one of: the first membrane of the composite membrane, the second membrane of the composite membrane, or any combination thereof is a fluoropolymer membrane that has at least one density described herein, at least one crystallinity described herein, at least one $CO_2$ permeability to moisture permeability ratio described herein, or any combination thereof.

In some embodiments, the battery further comprises a positive electrode.

In some embodiments, the positive electrode is at least partially disposed within the at least one housing. In some embodiments, the positive electrode is fully disposed within the at least one housing.

In some embodiments, the positive electrode is chosen from: Lithium Nickel Manganese Cobalt Oxide ("NMC"), Lithium Nickel Cobalt Aluminum Oxide ("NCA"), Lithium Manganese Oxide ("LMO"), Lithium Iron Phosphate ("LFP"), Lithium Cobalt Oxide ("LCO"), or any combination thereof. In some embodiments, the positive electrode is selected from the group consisting of: Lithium Nickel Manganese Cobalt Oxide ("NMC"), Lithium Nickel Cobalt Aluminum Oxide ("NCA"), Lithium Manganese Oxide ("LMO"), Lithium Iron Phosphate ("LFP"), Lithium Cobalt Oxide ("LCO"), and any combination thereof.

In some embodiments, the battery further comprises a negative electrode. In some embodiments, the negative electrode is at least partially disposed within the housing. In some embodiments, the negative electrode is fully disposed within the housing.

In some embodiments, the negative electrode is chosen from: Lithium, Graphite, Lithium Titanate ("LTO"), a Tin-Cobalt alloy, or any combination thereof. In some embodiments, the negative electrode is selected from the group consisting of: Lithium, Graphite, Lithium Titanate ("LTO"), a Tin-Cobalt alloy, and any combination thereof.

In some embodiments, the battery further comprises an electrolyte. In some embodiments, the electrolyte is disposed between the positive electrode and the negative electrode.

In some embodiments, the electrolyte is configured to release at least one gas during operation of the battery. In some embodiments, the at least one gas is chosen from Carbon Dioxide ("$CO_2$"), Hydrogen ($H_2$), Carbon Monoxide (CO), or any combination thereof. In some embodiments, the at least one gas is selected from the group consisting of $CO_2$, $H_2$, CO, and any combination thereof.

In some embodiments, the electrolyte is in the form of an electrolytic solution. In some embodiments, the electrolytic solution comprises at least one solvent and at least one electrolytic salt.

In some embodiments, the at least one solvent of the electrolytic solution comprises at least one organic solvent. In some embodiments, the at least one organic solvent of the electrolyte is chosen from propylene carbonate, ethylene carbonate, Diethyl Carbonate (DEC), Dimethyl Carbonate (DMC), or mixtures thereof. In some embodiments, the at least one organic solvent of the electrolyte is selected from the group consisting of: propylene carbonate, ethylene carbonate, Diethyl Carbonate (DEC), Dim ethyl Carbonate (DMC), and mixtures thereof.

In some embodiments, the electrolyte comprises at least one additive. A few examples of the at least one additive include, but are not limited to, Vinylene Carbonate (VC), Ethylene sulfite (ES), and Fluoroethylene Carbonate (FEC). In some embodiments, the at least one additive is configured to release the at least one gas described herein during operation of the battery.

In some embodiments, the electrolyte is impregnated within at least one separator. In some embodiments, the electrolyte is impregnated within a plurality of separators. In some embodiments, the electrolyte is partially impregnated within at least one separator. In some embodiments, the electrolyte is partially impregnated within a plurality of separators. In some embodiments, the electrolyte is fully impregnated within at least one separator. In some embodiments, the electrolyte is fully impregnated within a plurality of separators.

In some embodiments, the at least one separator or plurality of separators comprises at least one material chosen from polypropylene, polyethylene, at least one tetrafluoroethylene (TFE) polymer or copolymer, at least one homopolymer of vinylidene fluoride, at least one hexafluoropropylene (HFP)-vinylidene fluoride copolymer, or any combination thereof. In some embodiments, the at least one separator or plurality of separators comprises at least one material selected from the group consisting of polypropylene, polyethylene, at least one tetrafluoroethylene (TFE) polymer or copolymer, at least one homopolymer of vinylidene fluoride, at least one hexafluoropropylene (HFP)-vinylidene fluoride copolymer, and combinations thereof.

In some embodiments, the battery is a primary battery.

In some embodiments, the battery is a secondary battery. In some embodiments, the secondary battery is a lithium-ion battery. In some embodiments, the secondary battery is chosen from: a lead-acid battery, a nickel-metal hydride (NiMH) battery, a sodium-ion battery, a zinc-bromide battery, a zinc-cerium battery, a vanadium redox battery (VRB), a molten salt battery, or a silver zinc battery.

Figure 3:
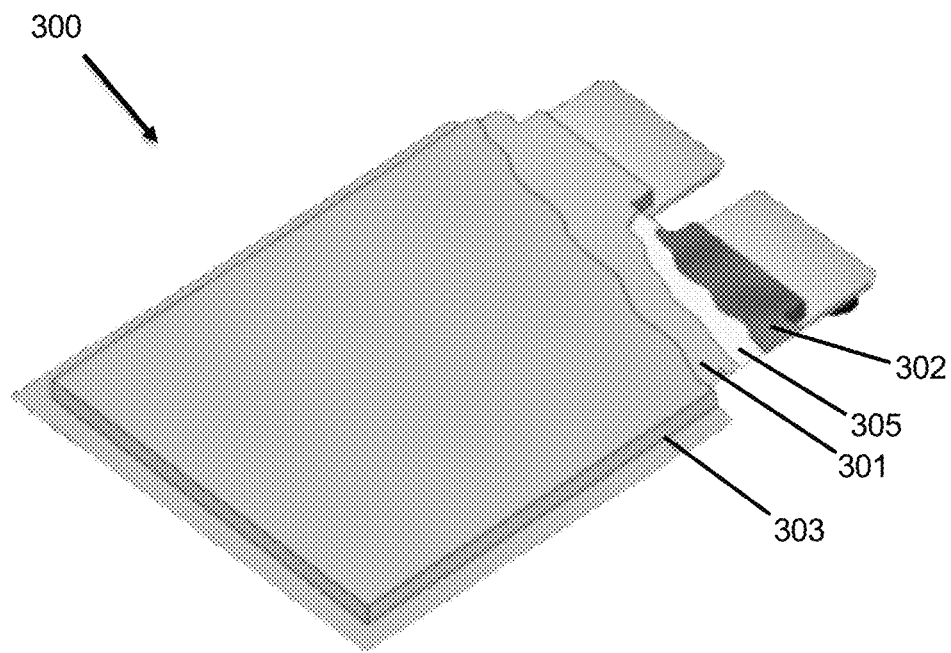

Yet another non-limiting example of a battery according to the present disclosure is shown in FIG. 3. As shown in the exemplary embodiment of FIG. 3, which is also a partially exploded view, battery 300 includes a positive electrode 301 (in the form of a cathode foil) and a negative electrode 302 (in the form of an anode foil) disposed within a housing 303. In some embodiments, the housing 303 may include an opening (not shown). In some embodiments, a membrane (not shown) covers the opening (not shown). In some embodiments, separator 305 is disposed between the positive electrode 301 and the negative electrode 302. The separator 305 may be impregnated with an electrolyte (not shown).

EXAMPLES

Exemplary non-limiting membrane samples according to the present disclosure were tested as described herein. The results are set forth below in Table 1. Table 1 illustrates test results for crystallinity, $CO_2$ permeability, moisture permeabilities, and $CO_2$ to moisture permeability ratio, for each numbered sample below (i.e., each of sample membranes 1-5 and comparative sample membranes 1-2).

Comparative sample membrane 2 is available as "NEOFLON® PFA film AF-0250" made from Danikin.

Crystallinities were measured using X-Ray diffraction ("XRD").

$CO_2$ permeabilities and moisture permeabilities were measured using the procedures set forth in Examples 9 and 10 below, respectively.

TABLE 1

Properties of Sample Membranes

| Sample membrane no. | Density g/cm$^3$ | Crystallinity % | $CO_2$ permeability cm$^3$ · cm/(cm$^2$ · s · cmHg) | Moisture permeability cm$^3$ · cm/(cm$^2$ · s · cmHg) | $CO_2$ permeability/Moisture permeability ratio - |
|---|---|---|---|---|---|
| 1 | 2.05 | 90.7 | $1.23 \times 10^{-9}$ | $1.53 \times 10^{-9}$ | 0.80 |
| 2 | 2.04 | 88.6 | $2.60 \times 10^{-9}$ | $3.34 \times 10^{-9}$ | 0.78 |
| 3 | 2.04 | 87.6 | $1.67 \times 10^{-9}$ | $3.15 \times 10^{-9}$ | 0.53 |
| 4 | 2.01 | 87.3 | $2.78 \times 10^{-9}$ | $4.99 \times 10^{-9}$ | 0.56 |
| 5 | 2.06 | 90.0 | $2.13 \times 10^{-9}$ | $2.06 \times 10^{-9}$ | 1.03 |
| Comparative 1 | 2.16 | 81.6 | $2.90 \times 10^{-9}$ | $6.27 \times 10^{-9}$ | 0.46 |
| Comparative 2 | 2.15 | 46.3 | $1.50 \times 10^{-9}$ | $3.45 \times 10^{-9}$ | 0.43 |

One non-limiting example of a battery according to the present disclosure is shown in FIG. 1. As shown in the exemplary embodiment of FIG. 1, which is a partially exploded view, battery 100 includes a positive electrode 101 and a negative electrode 102 disposed within a housing 103. In some embodiments, the housing 103 may include an opening 104, which may take the form of a pressure vent. In some embodiments, a membrane (not shown) covers the opening 104. In some embodiments, a separator 105 is disposed between the positive electrode 101 and the negative electrode 102. The separator 105 may be impregnated with an electrolyte (not shown).

Figure 2:
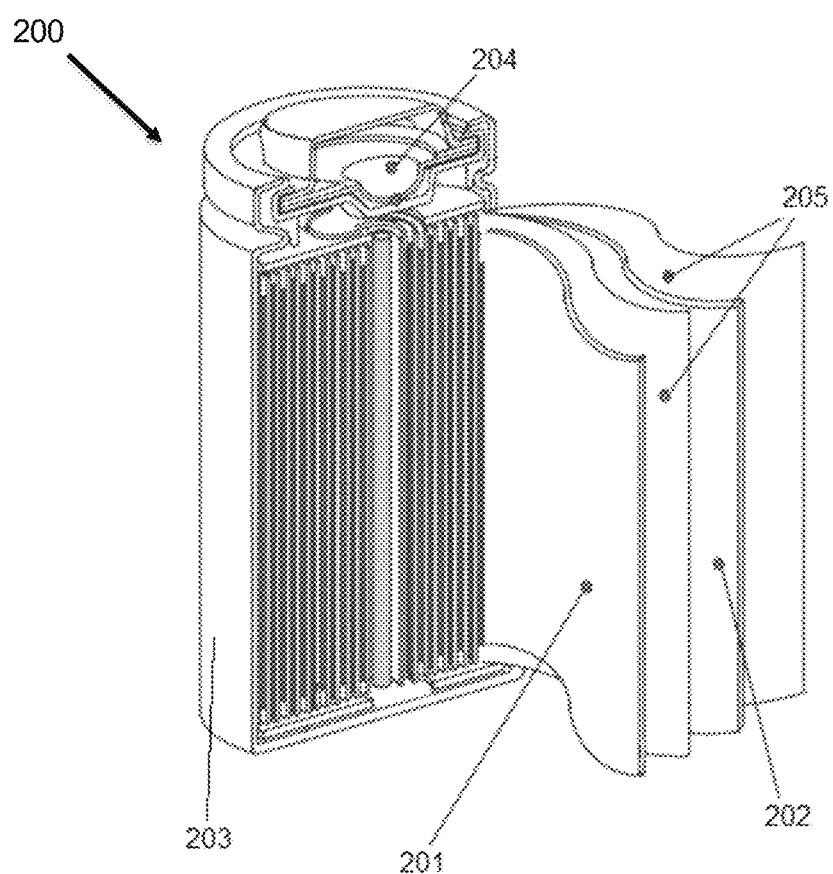

Another non-limiting example of a battery according to the present disclosure is shown in FIG. 2. As shown in the exemplary embodiment of FIG. 2, which is also a partially exploded view, battery 200 includes a positive electrode 201 and a negative electrode 202 disposed within a cylindrical housing 203. In some embodiments, the cylindrical housing 203 may include an opening 204, which may take the form of a gas release vent. In some embodiments, a membrane (not shown) covers the opening 204. In some embodiments, a plurality of separators 205 is disposed between the positive electrode 201 and the negative electrode 202. The plurality of separators 205 may be impregnated with an electrolyte (not shown).

Example 1: General Procedure for Preparation of Sample Membranes 3 and 4

A non-limiting procedure for preparing sample membrane numbers 3 and 4 is as follows.

A liquid lubricant chosen from solvent naphtha, white oil, naphthenic hydrocarbon, isoparaffinic hydrocarbon, a halide, a cyanide of isoparaffinic hydrocarbon, or any combination thereof was added to an unsintered fine powder of polytetrafluoroethylene (PTFE) to form a PTFE fine powder paste. The PTFE fine powder paste was loaded into an extruder and extruded into a tape shape to obtain an extruded PTFE tape. The extruded PTFE tape was rolled with a calender roll, continuously introduced into a dryer, and subjected to a drying treatment to remove the liquid lubricant, to obtain a dried PTFE tape. The dried PTFE tape was continuously introduced into a stretching apparatus and stretched in the tape advancing direction (i.e., the machine direction) to obtain a stretched PTFE film. The temperature at the time of stretching ranged from 250° C. to 320° C. across all samples. Further, the draw ratio was 100% or more across all samples. The porous structure was fixed (heat set) by continuously heat-treating the stretched PTFE film and was wound up to obtain sample membranes numbers 3 and 4. The heat treatment time was less than 10 seconds across all samples.

Example 2: Specific Procedure for Preparation of Sample Membrane 3

Naphtha solvent was added to Fluon® CD123 (an unsintered fine powder of PTFE, manufactured by Asahi Glass Co., Ltd.) to form a PTFE fine powder paste. The PTFE fine powder paste was loaded into an extruder and extruded into a tape shape having a width of 16 cm and a thickness of 720 μm to obtain an extruded PTFE tape. The extruded PTFE tape was rolled with a calender roll to a thickness of 240 μm, continuously introduced into a dryer, and dried at a temperature of 300° C. to remove the solvent naphtha to obtain a dried PTFE tape. The dried PTFE tape was continuously introduced into a stretching apparatus and stretched at a draw ratio of 105% in the tape advancing direction (i.e., the machine direction) at a temperature of 300° C. to obtain a stretched PTFE film.

The stretched PTFE film was heat-treated continuously at 350° C. for 3 seconds to fix (heat set) the porous structure and wound up to obtain sample membrane 3.

Example 3: Specific Procedure for Preparation of Sample Membrane 4

Sample membrane 4 was prepared in the same manner as sample membrane 3 except that the draw ratio was set to 110%.

Example 4: General Procedure for Preparation of Sample Membranes 1, 2, and 5

The general procedure that was used to prepare sample membrane numbers 1, 2, and 5 is set forth in the present example. Sample membrane numbers 1, 2, and 5 were composite membranes. Specifically, the preparation of sample membrane numbers 1, 2, and 5 differed from the preparation of sample membrane numbers 3 and 4 in that an additional PTFE film was added to the dried PTFE tape before stretching to form composite membranes.

The draw ratio ranged from 100% or higher across all samples. The heat treatment time was 3 seconds or less across all samples.

The biaxially stretched tape was obtained by preparing an extruded PTFE tape in the same manner as in Examples 1-3, i.e., by rolling the extruded PTFE tape with a calender roll, biaxially stretching the PTFE tape in the longitudinal direction and the transverse direction, and drying the biaxially stretched tape. The longitudinal draw ratio was 200% or more across all samples.

Example 5: Specific Procedure for Preparation of Sample Membrane 1

A dried PTFE tape was prepared as a film in the same manner as in Example 2. An extruded PTFE tape was also prepared in the same manner as Example 2 (i.e., as sample membrane 3) and was rolled with a calender roll to a thickness of 600 μm. The rolled PTFE tape was biaxially stretched at a longitudinal draw ratio of 500% and a transverse draw ratio of 1000%. The biaxially stretched tape was introduced into a dryer, dried at a temperature of 300° C. to remove the solvent naphtha, and dried to obtain a biaxially stretched film having a thickness of 35 μm.

The biaxially stretched film and the additional PTFE film were cut into the same size, combined between rolls, and stretched at a draw ratio of 105% in the tape advancing direction (machine direction) at a temperature of 300° C. by a stretching apparatus, thereby obtaining a stretched PTFE laminate. The stretched PTFE laminate was heat-treated continuously at 350° C. for 1 second to fix (heat set) the porous structure and wound up to obtain sample membrane 1.

Example 6: Specific Procedure for Preparation of Sample Membrane 2

Sample membrane 2 was prepared in the same manner as sample membrane 1, except that the draw ratio was set to 110%.

Example 7: Specific Procedure for Preparation of Sample Membrane 5

Sample membrane 5 was prepared in the same manner as sample membrane 1, except that the draw ratio was set to 105% and stretching was not performed.

Example 8: Preparation of Comparative Sample Membrane 1

Comparative sample membrane 1 was prepared as follows:

The extruded PTFE tape described in Example 2 was rolled with a calender roll to a thickness of 80 μm, introduced into a dryer and dried at a temperature of 300° C. to remove the solvent naphtha, thereby obtaining a dried PTFE tape. The dried PTFE tape was continuously introduced into a stretching apparatus and stretched at a draw ratio of 110% in the tape advancing direction (machine direction) at a temperature of 360° C. to obtain a stretched PTFE film. The stretched PTFE film was heat-treated continuously at 360° C. for 10 seconds to fix (heat set) the porous structure and wound up, thereby obtaining comparative sample membrane 1.

Example 9: Measurement of $CO_2$ Permeability

Generally, $CO_2$ permeability can be measured by commercial measurement equipment, such as the commercial measurement equipment described herein. Two non-limiting examples of methods that can be used to measure of $CO_2$ permeability—the differential pressure method and the equal pressure method.

Figure 4:
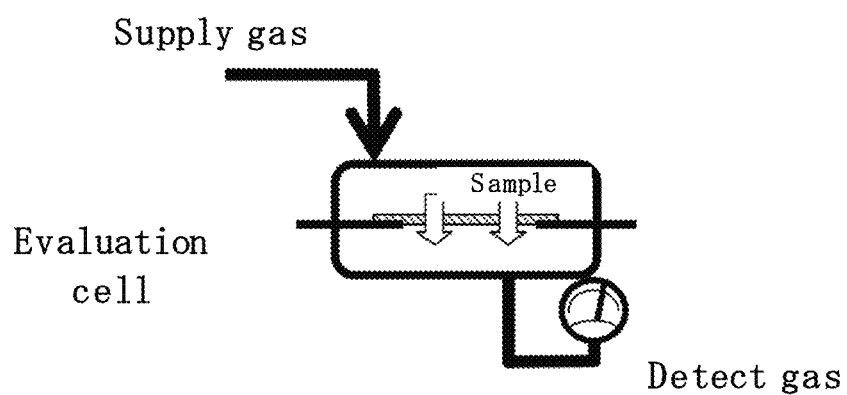
FIG. 4 depicts an exemplary test apparatus used to measure $CO_2$ permeability.

Herein, $CO_2$ permeabilities of the test samples were measured using the test-set up shown in FIG. 4. The equipment was GTR-11MJGG (GTR Tech). The "differential pressure method" was used.

The conditions were as follows: Temperature: 30° C. Pervious area: 15.2 cm$^2$ (φ 44 mm). Pervious gas: $H_2$, $CO_2$, $N_2$. Supply pressure: 0.5 kgf/cm$^2$. Differential pressure: 113 cmHg. Time: 0.2-10 min.

Example 10: Measurement of Moisture Permeability

Generally, moisture permeability can be measured by commercial measurement equipment. One non-limiting method that can be used is the equal pressure method.

Figure 5:
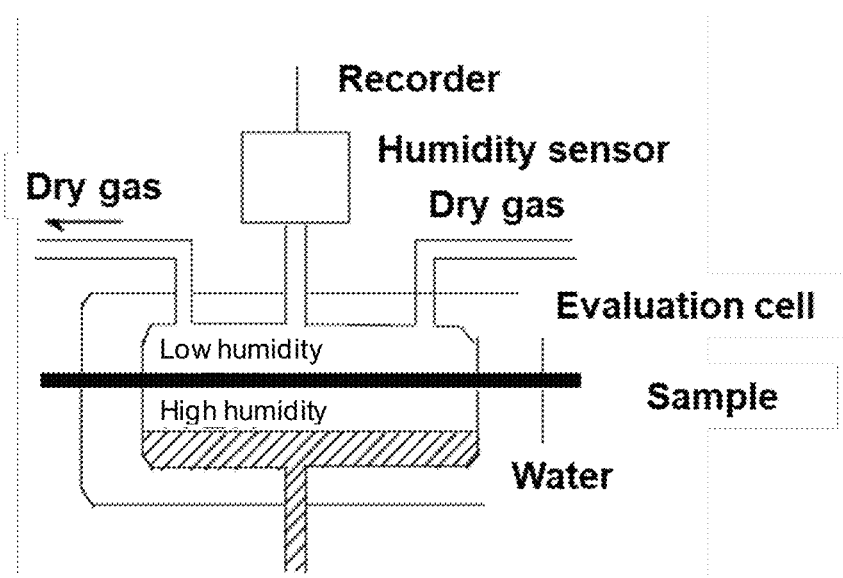
FIG. 5 depicts an exemplary test apparatus used to measure moisture permeability.

Herein, moisture permeabilities of the test samples were measured using the test-set up shown in FIG. 5. The equipment was the Lyssy L-80 series. The equal pressure method was used.

The conditions were as follows: Temperature: 40° C. Pervious area: $5\times10^3$ m$^2$. Relative humidity: 90%. Supply pressure: 0 kgf/cm$^2$. Time: 24 hours.

Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of and "consisting of" may be replaced with either of the other two terms. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

The invention claimed is:

1. A battery comprising:
a housing,
   wherein the housing comprises an opening;
a positive electrode,
   wherein the positive electrode is at least partially disposed within the housing;
a negative electrode,
   wherein the negative electrode is at least partially disposed within the housing;
an electrolyte,
   wherein the electrolyte is disposed between the positive electrode and the negative electrode,
   wherein the electrolyte is configured to release at least one gas during operation of the battery,
   wherein the at least one gas is chosen from carbon dioxide ($CO_2$), hydrogen ($H_2$), carbon monoxide (CO), or any combination thereof; and
at least one fluoropolymer membrane,
   wherein the at least one fluoropolymer membrane covers the opening of the housing,
   wherein the at least one fluoropolymer membrane has a crystallinity of 85% to 100%;
   wherein the at least one fluoropolymer membrane has a density of 2.0 g/cm$^3$ to 2.1 g/cm$^3$;
   wherein the at least one fluoropolymer membrane has a $CO_2$ permeability to moisture permeability ratio of more than 0.5.

2. The battery of claim 1, wherein the battery is a secondary battery.

3. The battery of claim 2, wherein the secondary battery is a lithium-ion battery.

4. The battery of claim 1, wherein the positive electrode is chosen from: lithium nickel manganese cobalt oxide ("NMC"), lithium nickel cobalt aluminum oxide ("NCA"), lithium manganese oxide ("LMO"), lithium iron phosphate ("LFP"), lithium cobalt oxide ("LCO"), or any combination thereof.

5. The battery of claim 1, wherein the negative electrode is chosen from: lithium, graphite, lithium titanate ("LTO"), a tin-cobalt alloy, or any combination thereof.

6. The battery of claim 1, wherein the electrolyte is in the form of an electrolytic solution, wherein the electrolytic solution comprises at least one solvent and at least one electrolytic salt.

7. The battery of claim 6, wherein the at least one solvent of the electrolytic solution comprises at least one organic solvent.

8. The battery of claim 7, wherein the at least one organic solvent of the electrolyte is chosen from propylene carbonate, ethylene carbonate, diethyl carbonate (DEC), dimethyl carbonate (DMC), or mixtures thereof.

9. The battery of claim 1, wherein the electrolyte comprises at least one additive, wherein the at least one additive is configured to release the at least one gas chosen from $CO_2$, $H_2$, CO, or any combination thereof during operation of the battery.

10. The battery of claim 1, wherein the electrolyte is impregnated within at least one separator.

11. The battery of claim 10, wherein the at least one separator comprises at least one material chosen from polypropylene, polyethylene, at least one tetrafluoroethylene (TFE) polymer or copolymer, at least one homopolymer of vinylidene fluoride, at least one hexafluoropropylene (HFP)-vinylidene fluoride copolymer, or any combination thereof.

12. The battery of claim 1, wherein the at least one fluoropolymer membrane comprises at least one of polytetrafluoroethylene (PTFE), densified PTFE (dPTFE), expanded PTFE (ePTFE), perfluoroalkoxyalkane (PFA), fluorinated ethylene-propylene (FEP), polyethylenetetrafluoroethylene (ETFE), polyethylenechlorotrifluoroethylene (ECTFE), polychlorotrifluoroethylene (PCTFE), or any combination thereof.

13. The battery of claim 1, wherein the at least one fluoropolymer membrane has a $CO_2$ permeability to moisture permeability ratio of more than 0.5 and less than 1.5.

14. A device comprising:
a housing,
   wherein the housing comprises an opening; and
at least one fluoropolymer membrane,
   wherein the at least one fluoropolymer membrane covers the opening of the housing,
   wherein the at least one fluoropolymer membrane has a crystallinity of 85% to 100%;
   wherein the at least one fluoropolymer membrane has a density of 2.0 g/cm$^3$ to 2.1 g/cm$^3$; and
   wherein the at least one fluoropolymer membrane has a $CO_2$ permeability to moisture permeability ratio of more than 0.5;
wherein the device is a battery.

* * * * *